Patented Sept. 24, 1935

2,015,359

UNITED STATES PATENT OFFICE 2,015,359

PLY-WOOD, LAMINATED PAPER BOARD, OR SIMILAR COMPOSITE ARTICLE

John D. Carter, Lansdowne, Pa., assignor to Philadelphia Quartz Company, Philadelphia, Pa., a corporation of Pennsylvania No Drawing. Application April 4, 1933, Serial No. 664,335

8 Claims. (Cl. 154—40)

This invention relates to the art of combining two or more plies of material, such as wood, paper, etc., to form a composite body or sheet.

Before proceeding with a statement of the objects of the invention, it should be understood that in the art referred to various adhesives or cements may be employed, some of the most useful of which are alkaline in character such, for example, as silicates of soda, alkaline caseins and alkaline starches. In addition some adhesives or cements may have other deleterious qualities or ingredients which, under certain conditions, will react unfavorably on the finished product.

For example, in articles where the adhesive is alkaline, certain conditions in the factory or in storage subsequent to fabrication may cause the plies or units of the article to absorb a percentage of the alkali present in the adhesive which is often sufficient to cause changes in the color of the plies themselves or of sensitive inks which may be applied to them. Furthermore, where rosin has been used as the sizing agent, the alkali may very readily react upon it to an injurious extent.

With the foregoing in mind, the principal objects of my invention may be said to reside in the following:

1. The provision of a method of treating the plies in such a way as to overcome or greatly minimize any deleterious effects which may come from the adhesive layer between the plies;

2. The provision of a method of treating the plies by means of which it is possible to adequately control or render harmless the effect of the alkali which may be present in an alkaline adhesive; and 3. The provision of an improved article of the character described.

In its broader aspects my invention contemplates attainment of the foregoing objects either by the use of substances which are capable of neutralizing the alkali or of preventing its movement through the plies, or both, and it should be noted in connection with the following disclosure that the exact nature of the protective effect is not completely understood at the present time.

More specifically considered I have found thru a rather extensive series of experiments that if the plies of material of which the article is to be made are treated with solutions of certain of the metallic salts, the desired objects are attained. All of the substances so far found to be useful are soluble in water to produce anions which are capable of forming neutral salts with sodium. Some of the salts of the so-called heavy metals as well as some of those of the alkaline earth metals I have found to be particularly effective. Each of the following has given more or less satisfactory results, i. e. sulfate of zinc and the chlorides of iron, barium, calcium and magnesium, although my invention is not to be limited to these particular substances since other substances having similar characteristics might equally well be employed.

As a specific example of preferred practice 12.5 parts by weight of hydrated magnesium chloride ($MgCl_2$—$6H_2O$) may be dissolved in 100 parts by weight of water. This solution may then be applied on the calender rolls of a paper making machine in a manner analogous to what is known in the art as water-finishing of paper. The whole surface of the paper may thus be continuously treated on the machine that makes the paper without the installation of any special mechanical devices, and the amount of the salt thus applied may approximate 1.4 pounds per thousand square feet. The susceptibility of a board made up of plies of material which have been treated in this way, to alkali stains coming from the adhesive, is markedly decreased.

It is not necessary, of course, to treat the material at the time of its manufacture as in the foregoing example since it might equally well be treated just prior to or at the time that it is to be employed in the manufacture of a laminated article. The method mentioned however is a very convenient one especially where the plies are of paper. Furthermore my experiments have shown that such a protective treatment may be applied either to the surface which is intended to be in contact with the adhesive or to the other surface. It should also be noted that in the case of plies having large open pores, such as veneers, it may be desirable to add a filler.

Another specific example which has been found to give satisfactory results is as follows: A solution of 5 parts by weight of zinc sulphate ($ZnSO_4.7H_2O$) in 20 parts of water when applied to the back of the ply prevented staining by the alkali of a silicate adhesive.

Other examples which were more or less effective follow:—

*Ferric chloride.*—5 parts $FeCl_3.xH_2O$ to 20 parts water made stains of its own, but showed fair protection against alkali.

*Barium chloride.*—5 parts $BaCl_2.2H_2O$ to 20 parts water showed protection.

*Calcium chloride.*—5 parts $CaCl_2.2H_2O$ to 30 parts water showed some protection.

The method of determining whether a board or a similar composite article will stain or not after a treatment such as described above is to put it into an oven under a definite pressure and at an elevated temperature in contact with paper which is saturated with moisture. This simulates what happens when plies which have been adhesively united are stacked and heating occurs in the pile while the fresh board is under the pressure of a load above it. Comparisons of treated and untreated board under these conditions show a marked advantage of the treatment.

In conclusion I should like to point out that the control effect which is made possible by my invention may be due to any one of a number of causes or to combinations thereof. In the first place the protective substance employed may be capable of reacting with the adhesive or the cement, or with the alkaline material derived therefrom, in such a way as to prevent or overcome the deleterious effect upon color or ink which might otherwise result. On the other hand the protective effect may be due to some holding or restraining effect upon the alkali which is more in the nature of a simple mechanical resistance to the passage of the alkali thru the material of the plies. Certain of the protectors above mentioned such, for example, as zinc sulphate and magnesium chloride form voluminous precipitates with sodium silicates and these precipitates may, in part at least, be responsible for holding, restraining or obstructing the alkali. In other words it is possible that films may be formed which mechanically resist the passage of the deleterious ingredients. As above stated, all of the substances so far found to be useful are metallic salts which are soluble in water to form anions capable of forming neutral salts with sodium.

What I claim is:—

1. The method of making ply-wood, laminated paper board or similar composite articles which includes treating a ply with an alkali restraining solution and uniting the plies with a silicate of soda adhesive.

2. In the manufacture of ply-wood, laminated paper board or similar composite articles which are united by means of a silicate of soda adhesive, the method which includes treating a ply with an aqueous solution of a metallic salt containing anions which are capable of forming neutral salts with sodium.

3. The method of making ply-wood, laminated paper board or similar composite articles which includes treating a ply with a solution of magnesium chloride and uniting the plies with a silicate of soda adhesive.

4. The method of making ply-wood, laminated paper board or similar composite articles which includes treating a ply with a solution of zinc sulphate and uniting the plies with a silicate of soda adhesive.

5. As a new article of manufacture, a composite structure such as ply-wood or laminated paper board composed of laminæ bonded together with a silicate of soda adhesive and treated with an aqueous solution of a metallic salt containing anions which are capable of forming neutral salts with sodium.

6. As a new article of manufacture, a composite structure such as ply-wood or laminated paper board composed of laminæ bonded together with a silicate of soda adhesive in which a ply to the outside of the adhesive is treated with a solution of magnesium chloride.

7. As a new article of manufacture, a composite structure such as ply-wood or laminated paper board composed of laminæ bonded together with a silicate of soda adhesive in which a ply to the outside of the adhesive is treated with a solution of zinc sulphate.

8. As a new article of manufacture, a composite structure such as ply-wood or laminated paper board composed of laminæ bonded together with a silicate of soda adhesive and treated with an alkali restraining solution.

JOHN D. CARTER.

DISCLAIMER 2,015,359.—*John D. Carter*, Lansdowne, Pa. PLY-WOOD, LAMINATED PAPER BOARD OR SIMILAR COMPOSITE ARTICLES. Patent dated September 24, 1935. Disclaimer filed July 18, 1940, by the assignee, *Philadelphia Quartz Company*.

Hereby enters this disclaimer to claim 2 of said patent by disclaiming the treatment of plies of ply-wood, laminated paper board and similar composite articles, united by means of a silicate of soda adhesive, with aqueous solutions of metallic salts, with the exception of salts of heavy metals and salts of the alkaline earth metals which are capable of forming neutral salts with sodium; and by disclaiming from claim 5 of said patent composite articles, such as ply-wood or laminated paper board composed of laminae bonded together with a silicate of soda adhesive and treated with aqueous solutions of metallic salts, with the exception of salts of heavy metals and salts of the alkaline earth metals which are capable of forming neutral salts with sodium.

[*Official Gazette August 13, 1940.*]